United States Patent
Bourilkov et al.

(10) Patent No.: US 11,031,686 B2
(45) Date of Patent: *Jun. 8, 2021

(54) POSITIVE BATTERY TERMINAL ANTENNA GROUND PLANE

(71) Applicant: DURACELL U.S. OPERATIONS, INC., Wilmington, DE (US)

(72) Inventors: Jordan Bourilkov, Bethany, CT (US); Joern Riemer, Santa Clara, CA (US); Robert Pavlinsky, Oxford, CT (US); Steven J. Specht, Brookfield, CT (US); George Turco, Wilimington, DE (US); Sergio Coronado, Bethel, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,205

(22) Filed: Nov. 18, 2019

(65) Prior Publication Data

US 2020/0083601 A1  Mar. 12, 2020

Related U.S. Application Data (63) Continuation of application No. 15/340,737, filed on Nov. 1, 2016, now Pat. No. 10,483,634.

(51) Int. Cl.
*H01Q 1/48*    (2006.01)
*H01Q 5/335*   (2015.01)
(Continued)

(52) U.S. Cl.
CPC ............... *H01Q 1/48* (2013.01); *H01M 6/08* (2013.01); *H01M 10/425* (2013.01);
(Continued)

(58) Field of Classification Search
CPC ........ H01M 10/425; H01M 2010/4278; H01Q 5/335; H01Q 1/48; H01Q 1/44
See application file for complete search history.

(56) References Cited

U.S. PATENT DOCUMENTS 3,354,565 A   11/1967   Emmons et al.
3,992,228 A   11/1976   Depoix
(Continued)

FOREIGN PATENT DOCUMENTS

CN   1084281 A   3/1994
CN   1163020 A   10/1997
(Continued)

OTHER PUBLICATIONS

Atmel Corporation, *Application Note AVR400: Low Cost A/D Converter*, available at http://www.atmel.com/images/doc0942.pfd (last visited Oct. 24, 2013).
(Continued)

*Primary Examiner* — Ricardo I Magallanes
(74) *Attorney, Agent, or Firm* — Marshall, Gerstein & Borun LLP (57) ABSTRACT

A positive terminal of a battery may act as an antenna ground plane for communicating battery status information. The positive terminal of the battery may include a first electrically conductive external surface with a first surface area. The negative terminal of the battery may include a second electrically conductive external surface with a second surface area less than the first surface area. An antenna impedance matching circuit may be electrically connected between a communication circuit, an antenna, and the positive terminal of the battery. Thus the positive terminal of the battery may act as a ground plane for the antenna.

19 Claims, 6 Drawing Sheets

(51) Int. Cl.
*H01Q 1/44* (2006.01)
*H01M 6/08* (2006.01)
*H01M 10/42* (2006.01)
*H01M 10/48* (2006.01)
*H01Q 5/50* (2015.01)

(52) U.S. Cl.
CPC ....... *H01M 10/4264* (2013.01); *H01M 10/48* (2013.01); *H01Q 1/44* (2013.01); *H01Q 5/335* (2015.01); *H01Q 5/50* (2015.01); *H01M 2010/4271* (2013.01); *H01M 2010/4278* (2013.01)

(56) References Cited

U.S. PATENT DOCUMENTS

| | | |
|---|---|---|
| 3,993,985 A | 11/1976 | Chopard et al. |
| 4,117,475 A | 9/1978 | Ebihara et al. |
| 4,149,146 A | 4/1979 | Ebihara et al. |
| 4,238,554 A | 12/1980 | Barrella |
| 4,302,751 A | 11/1981 | Nakauchi et al. |
| 4,460,870 A | 7/1984 | Finger |
| 4,482,615 A | 11/1984 | Rosansky et al. |
| 4,598,243 A | 7/1986 | Kawakami |
| 4,654,280 A | 3/1987 | Bailey |
| 4,759,765 A | 7/1988 | Van Kampen |
| 4,808,497 A | 2/1989 | Blomgren et al. |
| 4,860,185 A | 8/1989 | Brewer et al. |
| 4,952,330 A | 8/1990 | Leger et al. |
| 5,015,544 A | 5/1991 | Burroughs et al. |
| 5,032,825 A | 7/1991 | Kuznicki |
| 5,188,231 A | 2/1993 | Kivell et al. |
| 5,200,686 A | 4/1993 | Lee |
| 5,219,683 A | 6/1993 | Webber |
| 5,231,356 A | 7/1993 | Parker |
| 5,250,905 A | 10/1993 | Kuo et al. |
| 5,290,414 A | 3/1994 | Marple |
| 5,339,024 A | 8/1994 | Kuo et al. |
| 5,355,089 A | 10/1994 | Treger |
| 5,366,832 A | 11/1994 | Hayashi et al. |
| 5,389,458 A | 2/1995 | Weiss et al. |
| 5,389,470 A | 2/1995 | Parker et al. |
| 5,396,177 A | 3/1995 | Kuo et al. |
| 5,418,086 A | 5/1995 | Bailey |
| 5,424,722 A | 6/1995 | Inada et al. |
| 5,438,607 A | 8/1995 | Przygoda, Jr. et al. |
| 5,458,992 A | 10/1995 | Bailey |
| 5,458,997 A | 10/1995 | Crespi et al. |
| 5,491,038 A | 2/1996 | DePalma et al. |
| 5,494,496 A | 2/1996 | Huhndorff et al. |
| 5,514,491 A | 5/1996 | Webber |
| 5,525,439 A | 6/1996 | Huhndorff et al. |
| 5,543,246 A | 8/1996 | Treger |
| 5,569,556 A | 10/1996 | Bohmer |
| 5,587,573 A | 12/1996 | Owen et al. |
| 5,596,278 A | 1/1997 | Lin |
| 5,607,790 A | 3/1997 | Hughen et al. |
| 5,627,472 A | 5/1997 | Ofer et al. |
| 5,633,592 A | 5/1997 | Lang |
| 5,640,150 A | 6/1997 | Atwater |
| 5,654,640 A | 8/1997 | Bailey |
| 5,691,083 A | 11/1997 | Bolster |
| 5,737,114 A | 4/1998 | Bailey |
| 5,786,106 A | 7/1998 | Armani |
| 5,798,933 A | 8/1998 | Nicolai |
| 5,849,046 A | 12/1998 | Bailey |
| 5,925,479 A | 7/1999 | Wei et al. |
| 5,959,568 A | 9/1999 | Woolley |
| 5,963,012 A | 10/1999 | Garcia et al. |
| 6,014,014 A | 1/2000 | Owen et al. |
| 6,084,523 A | 7/2000 | Gelnovatch et al. |
| 6,127,062 A | 10/2000 | Sargeant et al. |
| 6,143,439 A | 11/2000 | Yoppolo et al. |
| 6,156,450 A | 12/2000 | Bailey |
| 6,169,397 B1 | 1/2001 | Steinbach et al. |
| 6,171,729 B1 | 1/2001 | Gan et al. |
| 6,208,235 B1 | 3/2001 | Trontelj |
| 6,218,054 B1 | 4/2001 | Webber |
| 6,252,377 B1 | 6/2001 | Shibutani et al. |
| 6,275,161 B1 | 8/2001 | Wan et al. |
| 6,300,004 B1 | 10/2001 | Tucholski |
| 6,407,534 B1 | 6/2002 | Mukainakano |
| 6,469,471 B1 | 10/2002 | Anbuky et al. |
| 6,483,275 B1 | 11/2002 | Nebrigic et al. |
| 6,587,250 B2 | 7/2003 | Armgarth et al. |
| 6,617,069 B1 | 9/2003 | Hopper et al. |
| 6,617,072 B2 | 9/2003 | Venkatesan et al. |
| 6,627,353 B1 | 9/2003 | Munshi |
| 6,670,073 B2 | 12/2003 | Tucholski et al. |
| RE38,518 E | 5/2004 | Tucholski |
| 6,730,136 B2 | 5/2004 | Webber |
| 6,774,685 B2 | 8/2004 | O'Toole et al. |
| 6,775,562 B1 | 8/2004 | Owens et al. |
| 6,849,360 B2 | 2/2005 | Marple |
| 6,979,502 B1 | 12/2005 | Gartstein et al. |
| 6,990,171 B2 | 1/2006 | Toth et al. |
| 7,067,882 B2 | 6/2006 | Singh |
| 7,079,079 B2 | 7/2006 | Jo et al. |
| 7,157,185 B2 | 1/2007 | Marple |
| 7,386,404 B2 | 6/2008 | Cargonja et al. |
| 7,474,230 B2 | 1/2009 | Blom et al. |
| 7,489,431 B2 | 2/2009 | Malmstrom et al. |
| 7,511,454 B1 | 3/2009 | Legg |
| 7,561,050 B2 | 7/2009 | Bhogal et al. |
| 7,576,517 B1 | 8/2009 | Cotton et al. |
| 7,586,416 B2 | 9/2009 | Ariyoshi et al. |
| 7,598,880 B2 | 10/2009 | Powell et al. |
| 7,606,530 B1 | 10/2009 | Anderson et al. |
| 7,715,884 B2 | 5/2010 | Book et al. |
| 7,741,970 B2 | 6/2010 | Cunningham et al. |
| 7,745,046 B2 | 6/2010 | Kim et al. |
| 7,768,236 B2 | 8/2010 | Takamura et al. |
| 7,772,850 B2 | 8/2010 | Bertness |
| 7,805,263 B2 | 9/2010 | Mack |
| 7,911,182 B2 | 3/2011 | Cargonja et al. |
| 7,944,368 B2 | 5/2011 | Carter et al. |
| 8,031,054 B2 | 10/2011 | Tuttle |
| 8,106,845 B2 | 1/2012 | Savry |
| 8,119,286 B2 | 2/2012 | Issaev et al. |
| 8,131,486 B2 | 3/2012 | Leonard et al. |
| 8,344,685 B2 | 1/2013 | Bertness et al. |
| 8,368,356 B2 | 2/2013 | Nakashima et al. |
| 8,374,507 B2 | 2/2013 | Hudson et al. |
| 8,424,092 B2 | 4/2013 | Ikeuchi et al. |
| 8,427,109 B2 | 4/2013 | Melichar |
| 8,471,888 B2 | 6/2013 | George et al. |
| 8,652,670 B2 | 2/2014 | Uchida |
| 8,653,926 B2 | 2/2014 | Detcheverry et al. |
| 8,900,731 B2 | 12/2014 | Bohne |
| 8,905,317 B1 | 12/2014 | Hsu et al. |
| 9,037,426 B2 | 5/2015 | Schaefer |
| 9,060,213 B2 | 6/2015 | Jones |
| 9,076,092 B2 | 7/2015 | Ritamaki et al. |
| 9,083,063 B2 | 7/2015 | Specht et al. |
| 9,146,595 B2 | 9/2015 | Forutanpour et al. |
| 9,167,317 B2 | 10/2015 | DeMar |
| 9,189,667 B2 | 11/2015 | Bourilkov et al. |
| 9,235,044 B2 | 1/2016 | Specht et al. |
| 9,297,859 B2 | 3/2016 | Mukaitani et al. |
| 9,312,575 B2 | 4/2016 | Stukenberg et al. |
| 9,331,378 B2 | 5/2016 | Merlin et al. |
| 9,331,384 B2 * | 5/2016 | Jenwatanavet ......... H01Q 1/46 |
| 9,425,487 B2 | 8/2016 | Bertness |
| 9,453,885 B2 | 9/2016 | Mukaitani et al. |
| 9,459,323 B2 | 10/2016 | Mukaitani et al. |
| 9,461,339 B2 | 10/2016 | Roohparvar |
| 9,478,850 B2 | 10/2016 | Bourilkov et al. |
| 9,551,758 B2 | 1/2017 | Bourilkov et al. |
| 9,568,556 B2 | 2/2017 | Bourilkov et al. |
| 9,619,612 B2 | 4/2017 | Kallfelz et al. |
| 9,639,724 B2 | 5/2017 | Bourilkov et al. |
| 9,661,576 B2 | 5/2017 | Tomisawa |
| 9,699,818 B2 | 7/2017 | Grothaus et al. |
| 9,726,763 B2 | 8/2017 | Dempsey et al. |

(56) References Cited

U.S. PATENT DOCUMENTS

| | | |
|---|---|---|
| 9,739,837 B2 | 8/2017 | Bourilkov et al. |
| 9,746,524 B2 | 8/2017 | Petrucelli |
| 9,774,210 B1 | 9/2017 | Wright |
| 9,823,310 B2 | 11/2017 | Bourilkov et al. |
| 9,841,462 B2 | 12/2017 | Kim et al. |
| 9,843,220 B2 | 12/2017 | Herrmann et al. |
| 9,869,726 B2 | 1/2018 | Zumstein et al. |
| 9,882,250 B2 | 1/2018 | Chappelle et al. |
| 9,887,463 B2 | 2/2018 | Bourilkov et al. |
| 9,893,390 B2 | 2/2018 | Specht et al. |
| 9,983,312 B2 | 5/2018 | Dempsey et al. |
| 10,094,886 B2 | 10/2018 | Bourilkov et al. |
| 10,151,802 B2 | 12/2018 | Riemer et al. |
| 10,184,988 B2 | 1/2019 | Bourilkov et al. |
| 10,297,875 B2 | 5/2019 | Riemer et al. |
| 10,416,309 B2 | 9/2019 | Dempsey et al. |
| 10,483,634 B2 | 11/2019 | Bourilkov et al. |
| 2001/0005123 A1 | 6/2001 | Jones et al. |
| 2001/0026226 A1 | 10/2001 | Andersson et al. |
| 2002/0001745 A1 | 1/2002 | Gartstein et al. |
| 2002/0086718 A1 | 7/2002 | Bigwood et al. |
| 2003/0070283 A1 | 4/2003 | Webber |
| 2003/0169047 A1 | 9/2003 | Chen |
| 2003/0170537 A1 | 9/2003 | Randell |
| 2003/0184493 A1 | 10/2003 | Robinet et al. |
| 2003/0228518 A1 | 12/2003 | Marple |
| 2004/0029007 A1 | 2/2004 | Kusumoto et al. |
| 2004/0048512 A1 | 3/2004 | Chen |
| 2004/0183742 A1 | 9/2004 | Goff et al. |
| 2005/0038614 A1 | 2/2005 | Botts et al. |
| 2005/0073282 A1 | 4/2005 | Carrier et al. |
| 2005/0095508 A1 | 5/2005 | Yamamoto |
| 2005/0112462 A1 | 5/2005 | Marple |
| 2005/0162129 A1 | 7/2005 | Mutabdzija et al. |
| 2005/0233214 A1 | 10/2005 | Marple et al. |
| 2005/0258797 A1 | 11/2005 | Hung |
| 2005/0277023 A1 | 12/2005 | Marple et al. |
| 2006/0017581 A1 | 1/2006 | Schwendinger et al. |
| 2006/0028179 A1 | 2/2006 | Yudahira et al. |
| 2006/0043933 A1 | 3/2006 | Latinis |
| 2006/0046152 A1 | 3/2006 | Webber |
| 2006/0046153 A1 | 3/2006 | Webber |
| 2006/0046154 A1 | 3/2006 | Webber et al. |
| 2006/0047576 A1 | 3/2006 | Aaltonen et al. |
| 2006/0163692 A1 | 7/2006 | Detecheverry et al. |
| 2006/0168802 A1 | 8/2006 | Tuttle |
| 2006/0170397 A1 | 8/2006 | Srinivasan et al. |
| 2006/0208898 A1 | 9/2006 | Swanson et al. |
| 2006/0247156 A1 | 11/2006 | Vanderby et al. |
| 2006/0261960 A1 | 11/2006 | Haraguchi et al. |
| 2007/0080804 A1 | 4/2007 | Hirahara et al. |
| 2007/0096697 A1 | 5/2007 | Maireanu |
| 2007/0108946 A1 | 5/2007 | Yamauchi et al. |
| 2007/0182576 A1 | 8/2007 | Proska et al. |
| 2007/0210924 A1 | 9/2007 | Arnold et al. |
| 2007/0273329 A1 | 11/2007 | Kobuse et al. |
| 2008/0053716 A1 | 3/2008 | Scheucher |
| 2008/0076029 A1 | 3/2008 | Bowden et al. |
| 2008/0079391 A1 | 4/2008 | Schroeck et al. |
| 2008/0157924 A1 | 7/2008 | Batra |
| 2008/0160392 A1 | 7/2008 | Toya et al. |
| 2008/0206627 A1 | 8/2008 | Wright |
| 2008/0218351 A1 | 9/2008 | Corrado et al. |
| 2008/0252462 A1 | 10/2008 | Sakama |
| 2009/0008031 A1 | 1/2009 | Gould et al. |
| 2009/0009177 A1 | 1/2009 | Kim et al. |
| 2009/0024309 A1 | 1/2009 | Crucs |
| 2009/0041228 A1 | 2/2009 | Owens et al. |
| 2009/0098462 A1 | 4/2009 | Fujiwara et al. |
| 2009/0148756 A1 | 6/2009 | Specht et al. |
| 2009/0155673 A1 | 6/2009 | Northcott |
| 2009/0179763 A1 | 7/2009 | Sheng |
| 2009/0214950 A1 | 8/2009 | Bowden et al. |
| 2009/0263727 A1 | 10/2009 | Josephs et al. |
| 2009/0273473 A1 | 11/2009 | Tuttle |
| 2009/0289825 A1 | 11/2009 | Trinkle |
| 2009/0297949 A1 | 12/2009 | Berkowitz et al. |
| 2009/0308936 A1 | 12/2009 | Nitzan et al. |
| 2010/0019733 A1 | 1/2010 | Rubio |
| 2010/0030592 A1 | 2/2010 | Evans et al. |
| 2010/0073003 A1 | 3/2010 | Sakurai et al. |
| 2010/0081049 A1 | 4/2010 | Holl et al. |
| 2010/0085008 A1 | 4/2010 | Suzuki et al. |
| 2010/0087241 A1 | 4/2010 | Nguyen et al. |
| 2010/0143753 A1 | 6/2010 | Kim et al. |
| 2010/0209744 A1 | 8/2010 | Kim |
| 2010/0219252 A1 | 9/2010 | Kikuchi et al. |
| 2010/0295943 A1 | 11/2010 | Cha et al. |
| 2010/0308974 A1 | 12/2010 | Rowland et al. |
| 2011/0018777 A1 | 1/2011 | Brown |
| 2011/0023130 A1 | 1/2011 | Gudgel et al. |
| 2011/0104520 A1 | 5/2011 | Ahn |
| 2011/0123874 A1 | 5/2011 | Issaev et al. |
| 2011/0163752 A1 | 7/2011 | Janousek et al. |
| 2011/0293969 A1 | 12/2011 | Hoofman et al. |
| 2012/0021266 A1 | 1/2012 | Marple et al. |
| 2012/0056002 A1 | 3/2012 | Ritamaki et al. |
| 2012/0081774 A1 | 4/2012 | De Paiva Martins et al. |
| 2012/0086615 A1 | 4/2012 | Norair |
| 2012/0121943 A1 | 5/2012 | Roohparvar |
| 2012/0183862 A1 | 7/2012 | Gupta et al. |
| 2012/0190305 A1 | 7/2012 | Wuidart |
| 2012/0206102 A1 | 8/2012 | Okamura et al. |
| 2012/0206302 A1 | 8/2012 | Ramachandran et al. |
| 2012/0217971 A1 | 8/2012 | Deluca |
| 2012/0235870 A1 | 9/2012 | Forster |
| 2012/0277832 A1 | 11/2012 | Hussain |
| 2012/0299597 A1 | 11/2012 | Shigemizu |
| 2012/0323511 A1 | 12/2012 | Saigo et al. |
| 2013/0069768 A1* | 3/2013 | Madhyastha .......... G08C 19/12 340/12.5 |
| 2013/0117595 A1 | 5/2013 | Murawski et al. |
| 2013/0127611 A1 | 5/2013 | Bernstein et al. |
| 2013/0148283 A1 | 6/2013 | Forutanpour et al. |
| 2013/0154652 A1 | 6/2013 | Rice et al. |
| 2013/0161380 A1 | 6/2013 | Joyce et al. |
| 2013/0162402 A1 | 6/2013 | Amann et al. |
| 2013/0162403 A1 | 6/2013 | Striemer et al. |
| 2013/0162404 A1 | 6/2013 | Striemer et al. |
| 2013/0164567 A1 | 6/2013 | Olsson et al. |
| 2013/0171479 A1 | 7/2013 | Kim et al. |
| 2013/0183568 A1 | 7/2013 | Babinec et al. |
| 2013/0185008 A1 | 7/2013 | Itabashi et al. |
| 2013/0271072 A1 | 10/2013 | Lee et al. |
| 2013/0295421 A1 | 11/2013 | Teramoto et al. |
| 2013/0320989 A1 | 12/2013 | Inoue et al. |
| 2014/0062663 A1 | 3/2014 | Bourilkov et al. |
| 2014/0139380 A1 | 5/2014 | Ouyang et al. |
| 2014/0188413 A1 | 7/2014 | Bourilkov et al. |
| 2014/0197802 A1 | 7/2014 | Yamazaki |
| 2014/0229129 A1 | 8/2014 | Campbell et al. |
| 2014/0302348 A1 | 10/2014 | Specht et al. |
| 2014/0302351 A1 | 10/2014 | Specht et al. |
| 2014/0320144 A1 | 10/2014 | Nakaya |
| 2014/0342193 A1 | 11/2014 | Mull et al. |
| 2014/0346873 A1 | 11/2014 | Colangelo et al. |
| 2014/0347249 A1* | 11/2014 | Bourilkov ................ H01Q 7/00 343/904 |
| 2014/0370344 A1 | 12/2014 | Lovelace et al. |
| 2014/0379285 A1 | 12/2014 | Dempsey et al. |
| 2015/0061603 A1 | 3/2015 | Loftus et al. |
| 2015/0064524 A1 | 3/2015 | Noh et al. |
| 2015/0162649 A1 | 6/2015 | Bae et al. |
| 2015/0349391 A1* | 12/2015 | Chappelle .......... H01M 10/425 429/7 |
| 2015/0357685 A1* | 12/2015 | Iwasawa ............ G01R 31/3644 429/90 |
| 2016/0034733 A1 | 2/2016 | Bourilkov et al. |
| 2016/0049695 A1 | 2/2016 | Lim et al. |
| 2016/0064781 A1 | 3/2016 | Specht et al. |
| 2016/0092847 A1 | 3/2016 | Buchbinder |
| 2016/0137088 A1 | 5/2016 | Lim et al. |
| 2016/0154025 A1 | 6/2016 | Song et al. |
| 2016/0277879 A1 | 9/2016 | Daoura et al. |

(56) References Cited

U.S. PATENT DOCUMENTS

| | | |
|---|---|---|
| 2017/0040698 A1 | 2/2017 | Bourilkov et al. |
| 2017/0062841 A1 | 3/2017 | Riemer et al. |
| 2017/0062880 A1 | 3/2017 | Riemer et al. |
| 2017/0092994 A1 | 3/2017 | Canfield et al. |
| 2017/0125855 A1 | 5/2017 | Gong et al. |
| 2017/0176539 A1 | 6/2017 | Younger |
| 2017/0286918 A1 | 10/2017 | Westermann et al. |
| 2017/0301961 A1 | 10/2017 | Kim et al. |
| 2017/0315183 A1 | 11/2017 | Chao et al. |
| 2017/0331162 A1 | 11/2017 | Clarke et al. |
| 2018/0040929 A1 | 2/2018 | Chappelle et al. |
| 2018/0088182 A1 | 3/2018 | Bourilkov et al. |
| 2018/0120386 A1 | 5/2018 | Riemer et al. |
| 2018/0123174 A1 | 5/2018 | Riemer et al. |
| 2018/0123175 A1 | 5/2018 | Riemer et al. |
| 2018/0123176 A1 | 5/2018 | Riemer et al. |
| 2018/0123233 A1 | 5/2018 | Bourilkov et al. |
| 2018/0159225 A1 | 6/2018 | Bourilkov et al. |
| 2019/0113579 A1 | 4/2019 | Riemer et al. |
| 2019/0137572 A1 | 5/2019 | Bourilkov et al. |
| 2020/0011997 A1 | 1/2020 | Dempsey et al. |

FOREIGN PATENT DOCUMENTS

| | | | |
|---|---|---|---|
| CN | 1228540 A | | 9/1999 |
| CN | 1315072 A | | 9/2001 |
| CN | 1529182 A | | 9/2004 |
| CN | 2828963 Y | | 10/2006 |
| CN | 101126795 A | | 2/2008 |
| CN | 201142022 Y | | 10/2008 |
| CN | 201233435 Y | | 5/2009 |
| CN | 101702792 A | | 5/2010 |
| CN | 101785164 A | | 7/2010 |
| CN | 102097844 A | | 6/2011 |
| CN | 102142186 A | | 8/2011 |
| CN | 102544709 A | | 7/2012 |
| CN | 202308203 U | | 7/2012 |
| CN | 202720320 U | | 2/2013 |
| CN | 202856390 U | | 4/2013 |
| CN | 103682482 A | | 3/2014 |
| CN | 104635169 A | | 5/2015 |
| CN | 105337367 A | | 2/2016 |
| CN | 205160145 U | | 4/2016 |
| CN | 106405241 A | | 2/2017 |
| CN | 106848448 A | | 6/2017 |
| CN | 107284272 A | | 10/2017 |
| CN | 206804833 U | | 12/2017 |
| DE | 10118027 A1 | | 11/2002 |
| DE | 10118051 A1 | | 11/2002 |
| EP | 0523901 A1 | | 1/1993 |
| EP | 718908 A1 | * 12/1994 | ............... H01Q 1/22 |
| EP | 1450174 A1 | | 8/2004 |
| EP | 1693807 A1 | | 8/2006 |
| EP | 1786057 A2 | | 5/2007 |
| EP | 1821363 A1 | | 8/2007 |
| EP | 2065962 A1 | | 6/2009 |
| EP | 2204873 A1 | | 7/2010 |
| EP | 2324535 A1 | | 5/2011 |
| EP | 2328223 A1 | | 6/2011 |
| EP | 2645447 A1 | | 10/2013 |
| EP | 2680093 A2 | | 1/2014 |
| EP | 2790262 A1 | | 10/2014 |
| EP | 3128599 A1 | | 2/2017 |
| JP | S52005581 A | | 1/1977 |
| JP | 61169781 | | 7/1986 |
| JP | 02142324 | | 5/1990 |
| JP | H03131771 A | | 6/1991 |
| JP | H06284170 A | | 10/1994 |
| JP | H09005366 A | | 1/1997 |
| JP | 10014003 | | 1/1998 |
| JP | 2000077928 A | | 3/2000 |
| JP | 2001022905 A | | 1/2001 |
| JP | 2004085580 A | | 3/2004 |
| JP | 2004-253858 A | | 9/2004 |
| JP | 2004534430 A | | 11/2004 |
| JP | 2005327099 A | | 11/2005 |
| JP | 2006139544 A | | 6/2006 |
| JP | 2006284431 A | | 10/2006 |
| JP | 2006324074 A | | 11/2006 |
| JP | 2007515848 A | | 6/2007 |
| JP | 2007171045 A | | 7/2007 |
| JP | 2008042985 A | | 2/2008 |
| JP | 2008-530682 A | | 8/2008 |
| JP | 2008181855 A | | 8/2008 |
| JP | 2009-37374 | | 2/2009 |
| JP | 2010098361 A | | 4/2010 |
| JP | 2010-154012 A | | 7/2010 |
| JP | 2011113759 A | | 6/2011 |
| JP | 2011203595 A | | 10/2011 |
| JP | 2012/0056002 A | | 3/2012 |
| JP | 2012085491 A | | 4/2012 |
| JP | 2012-129183 A | | 7/2012 |
| JP | 2012161614 A | | 8/2012 |
| JP | 2012170262 A | | 9/2012 |
| JP | 2013-038967 A | | 2/2013 |
| JP | 2013038961 A | | 2/2013 |
| JP | 2013120640 A | | 6/2013 |
| KR | 2011-0018488 A | | 2/2011 |
| TW | M510009 U | | 10/2015 |
| TW | I580153 B | | 4/2017 |
| WO | WO-95/01062 A1 | | 1/1995 |
| WO | WO-03/047064 A2 | | 6/2003 |
| WO | WO-2004/047215 A1 | | 6/2004 |
| WO | WO-2004/107251 A2 | | 12/2004 |
| WO | WO-2005/078673 A1 | | 8/2005 |
| WO | WO-2006/048838 A1 | | 5/2006 |
| WO | WO-2006/085291 A2 | | 8/2006 |
| WO | WO-2008/151181 A1 | | 12/2008 |
| WO | WO-2008/156735 A1 | | 12/2008 |
| WO | WO-2010/127509 A1 | | 11/2010 |
| WO | WO-2011/063679 A1 | | 6/2011 |
| WO | WO-2011/096863 A1 | | 8/2011 |
| WO | WO-2012/051272 A2 | | 4/2012 |
| WO | WO-2012/061262 A1 | | 5/2012 |
| WO | WO-2012/070635 A1 | | 5/2012 |
| WO | WO-2012/083759 A1 | | 6/2012 |
| WO | WO-2013/022857 A2 | | 2/2013 |
| WO | WO-2013/024341 A1 | | 2/2013 |
| WO | WO-2013/069423 A1 | | 5/2013 |
| WO | WO-2013/084481 A1 | | 6/2013 |
| WO | WO-2013/101652 A1 | | 7/2013 |
| WO | WO-2015/183609 A1 | | 12/2015 |
| WO | WO-2016/146006 A1 | | 9/2016 |
| WO | WO-2016/166735 A1 | | 10/2016 |
| WO | WO-2016/172542 A1 | | 10/2016 |

OTHER PUBLICATIONS

International Application No. PCT/US2017/059465, International Preliminary Report on Patentability, dated Nov. 28, 2018.

International Application No. PCT/US2017/059465, International Search Report and Written Opinion, dated Jan. 18, 2018.

Kooser, Tethercell magically turns AA batteries into Bluetooth devices, CNET.com, downloaded from the Internet at: <https://www.cnet.com/news/tethercell-magically-turns-aa-batteries-into-bluetooth-devices/> (Jan. 8, 2013).

Tethercell Smart Battery Adapter fundraising campaign on Indiegogo website (<https://www.indiegogo.com/projects/tethercell-smart-battery-adapter#/>) (launched Oct. 2013).

Tethercell video uploaded at <https://vimeo.com/53823785> (Oct. 2012).

Yamashiro, Voltage Detecting Circuit, Japanese Patent No. 52005581, Hitashi Ltd., (Jan. 17, 1977), Translated by the United States Patent and Trademark Office via Phoenix Translations (Elgin, TX) in Feb. 2018.

* cited by examiner

POSITIVE BATTERY TERMINAL ANTENNA GROUND PLANE

CROSS-REFERENCE TO RELATED APPLICATIONS

The present application is a continuation of U.S. patent application Ser. No. 15/340,737 filed Nov. 1, 2016, and entitled "Positive Battery Terminal Antenna Ground Plane." The disclosure of which is hereby incorporated herein by reference in its entirety.

FIELD OF THE INVENTION

The disclosure generally relates to apparatus and methods to use external surfaces of a battery as a ground plane for an antenna in a communication system and, more particularly, to use a positive terminal and electrically conductive external surface, typically the metal battery can or casing, of a battery as a ground plane for an antenna that communicates battery status information.

BACKGROUND

On-cell battery fuel gauges may require a user to press two buttons, wait several seconds, and then observe an indication of the state of charge of the battery. Such a solution may require removing the batteries from the device and checking the battery to decide whether it is necessary to replace the battery. As such, solutions that avoid removal of a battery from a device to check the remaining capacity provide significant advantages for consumers.

In some embodiments, a battery status may be detected by remote indication using an analog to digital converter (ADC) and a Near Field Communication (NFC) Integrated Circuit (IC) together with a magnetic diverter and a thin foil antenna on the battery label. Application software, for example executing on a smart phone, may be used to receive battery status information remotely. Such battery status information may include the battery voltage that is then used to provide an indication of battery status to the user.

Conventionally packaged silicon integrated circuits together with the associated discrete resistors and capacitors when installed, for example, directly onto the label of the battery cell may increase the diameter of the cell beyond the capabilities of many existing device cavities. Furthermore, NFC detection range may in some embodiments be limited to several centimeters.

Operation of RF transceivers near metal surfaces may present technical challenges, for example with parasitic coupling of the antenna to the metal surfaces. In some embodiments battery cells may be constructed with a conductive metal can, for example constructed with steel, particularly primary alkaline batteries available to consumers. The presence of such metal surfaces near an antenna installed on a wireless transmitter circuit may detune the antenna significantly, deteriorating performance and reducing the usable range to a receiving device.

SUMMARY

One exemplary embodiment includes an apparatus that includes a positive terminal of a battery as a ground plane of an antenna and having a first electrically conductive external surface with a first surface area; a negative terminal of the battery having a second electrically conductive external surface with a second surface area; and an antenna impedance matching circuit, electrically connected between a communication circuit, the antenna, and the positive terminal of the battery. The first surface area is greater than the second surface area.

Another exemplary embodiment includes a method, that includes providing a positive terminal of a battery as a ground plane of an antenna and having a first electrically conductive external surface with a first surface area; providing a negative terminal of the battery having a second electrically conductive external surface with a second surface area less than the first surface area; providing an antenna impedance matching circuit; and electrically connecting the antenna impedance matching circuit between the positive terminal of the battery, a communication circuit, and the antenna.

Yet another exemplary embodiment includes a method that includes providing a negative terminal of a primary alkaline battery with a first surface area; providing a positive terminal of a primary alkaline battery as a ground plane of an antenna, the positive terminal comprising a second surface area greater than the first surface area; providing an antenna impedance matching circuit; electrically connecting the antenna impedance matching circuit to the positive terminal of the primary alkaline battery; electrically connecting the antenna impedance matching circuit to a communication circuit and an antenna; and calculating data relating to the remaining capacity of the battery including corrections for load on the battery related to transmission and reception of data using the communication circuit, the antenna impedance matching circuit, the antenna, and the positive terminal of the primary alkaline battery. In such primary alkaline batteries, the anode can comprise zinc and the cathode can comprise manganese oxide. In yet another optional form, the battery is a primary Zinc-Carbon battery, the battery comprising an anode, a cathode, and an electrolyte. In addition to being a primary battery such as a primary alkaline battery or a primary Zinc-Carbon battery, the battery may be a primary lithium battery. Alternatively, the battery can be a secondary battery, for example, a secondary battery such as a nickel metal hydride (NiMH) battery, a nickel cadmium (NiCad) battery, a silver/zinc battery, a nickel/zinc battery, or a lithium solid state rechargeable battery. For rechargeable chemistries, the terminals of the battery switch during charging or discharging. Generally, any battery chemistry may be used in accordance with the disclosure provided that the electrically conductive metal battery can is electrically connected to the positive terminal.

In accordance with the teachings of the disclosure, any one or more of the foregoing aspects of an apparatus or a method may further include any one or more of the following optional forms.

In one optional form, the first electrically conductive external surface electrically connects to a cathode of the battery, and the second electrically conductive external surface electrically connects to an anode of the battery.

In another optional form, a ground plane of the communication circuit electrically connects to the negative terminal of the battery.

In yet another optional form, the antenna impedance matching circuit comprises a balun configured to convert, for a first communication frequency, an input impedance of the impedance matching circuit to an output impedance of the impedance matching circuit.

In still another optional form an electrical length of the first electrically conductive external surface is greater than 0.25 of a wavelength of a signal transmitted by the communication circuit into the antenna impedance matching circuit, and the electrical length of the first electrically conductive external surface is a physical length of the first electrically conductive external surface multiplied by the ratio of (i) the propagation time of the signal through the first electrically conductive external surface to (ii) the propagation time of the signal in free space over a distance equal to the physical length of the first electrically conductive external surface.

In still another optional form, the electrical length of the first electrically conductive external surface is configured to minimize a reflected power from the antenna back into the antenna impedance matching circuit as a result of the communication circuit transmitting the signal.

In still another optional form, the antenna impedance matching circuit comprises at least one of (i) a capacitor and (ii) an inductor, and at least one of (i) the capacitor and (ii) the inductor are electrically connected between the communication circuit and the positive terminal of the battery.

In still another optional form, the battery is a primary alkaline battery, the battery comprising an anode, a cathode, and an alkaline electrolyte. In such primary alkaline batteries, the anode can comprise zinc and the cathode can comprise manganese oxide. In yet another optional form, the battery is a primary Zinc-Carbon battery, the battery comprising an anode, a cathode, and an electrolyte. In addition to being a primary battery such as a primary alkaline battery or a primary Zinc-Carbon battery, the battery may be a primary lithium battery. Alternatively, the battery can be a secondary battery, for example, a secondary battery such as a nickel metal hydride (NiMH) battery, a nickel cadmium (NiCad) battery, a silver/zinc battery, a nickel/zinc battery, a lithium-ion or a lithium solid state rechargeable battery. Generally, any battery chemistry may be used in accordance with the disclosure provided that the exterior metal battery can is electrically connected to the positive terminal.

In still another optional form, the balun comprises a first winding and a second winding around a magnetic ferrite, a first end of the first winding is electrically connected to the antenna, and a second end of the first winding is electrically connected to the positive terminal of the battery.

In still another optional form, a first end of the second winding is electrically connected to the communication circuit, and a second end of the second winding is electrically connected to the antenna.

Another optional form includes electrically connecting the antenna impedance matching circuit to a communication circuit and an antenna.

Yet another optional form includes electrically connecting a ground plane of the communication circuit to the negative terminal of the battery.

Still another optional form includes providing a balun configured to convert an input impedance encountered by a signal transmitted by the communication circuit into the impedance matching circuit to an output impedance.

Still another optional form includes providing the first electrically conductive external surface with an electrical length greater than 0.25 of a wavelength of a signal transmitted by the communication circuit into the antenna impedance matching circuit.

Still another optional form includes providing the first electrically conductive external surface with an electrical length that minimizes a reflected power from the antenna back into the antenna impedance matching circuit as a result of the communication circuit transmitting the signal.

Still another optional form includes providing the antenna impedance matching circuit with at least one of (i) a capacitor and (ii) an inductor, and electrically connecting at least one of (i) the capacitor and (ii) the inductor between a communication circuit and the positive terminal of the battery.

Still another optional form includes providing a primary alkaline battery comprising an anode, a cathode, and an alkaline electrolyte; electrically connecting the cathode of the battery to the first electrically conductive external surface of a battery; and electrically connecting the anode of the battery to the second electrically conductive external surface of a battery. In such primary alkaline batteries, the anode can comprise zinc and the cathode can comprise manganese oxide. In addition to being a primary battery such as a primary alkaline battery, the battery may be a primary lithium battery. Alternatively, the battery can be a secondary battery, for example, a secondary battery such as a nickel metal hydride (NiMH) battery, a nickel cadmium (NiCad) battery, a silver/zinc battery, a nickel/zinc battery, or a lithium ion, lithium polymer or a lithium solid state rechargeable battery. Generally, any battery chemistry may be used in accordance with the disclosure provided that the exterior metal battery can is electrically connected to the positive terminal.

Still another optional form includes providing a balun comprising a first winding and a second winding around a magnetic ferrite such that an output impedance of the balun approximates an input impedance of the antenna; electrically connecting a first end of the first winding to the antenna; and electrically connecting a second end of the first winding to the positive terminal of the battery.

Still another optional form includes electrically connecting a first end of the second winding to the communication circuit; and electrically connecting a second end of the second winding to the antenna.

Exemplary embodiments may include computer-implemented methods that may, in other embodiments, include apparatus configured to implement the method, and/or non-transitory computer readable mediums comprising computer-executable instructions that cause a processor to perform the method.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. Each figure depicts a particular aspect of the disclosed system and methods, and each of the figures is intended to accord with a possible aspect thereof. Further, wherever possible, the following description refers to the reference numerals included in the following figures, in which features depicted in multiple figures are designated with consistent reference numerals.

There are shown in the Figures arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

One embodiment of the present disclosure includes enabling an RF wireless sensor to operate on a battery with positive-biased case, or can, to improve the range, or maximum reading distance, between the transmitter installed on the battery and the reader. The reader may include a smart phone, tablet, local network hub, or another embodiment of a computing device.

Figure 1:
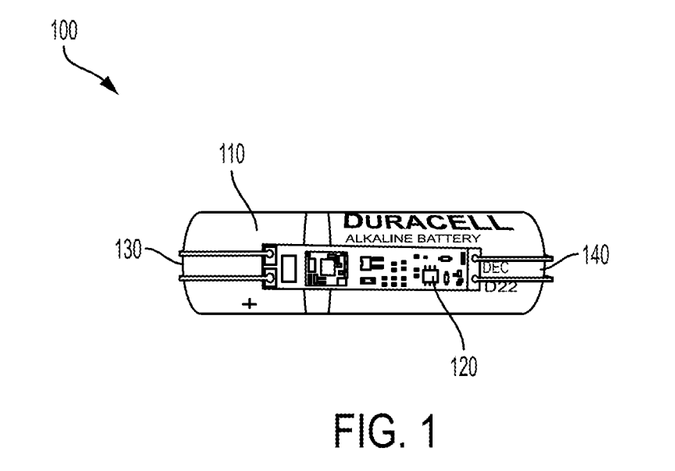
FIG. 1 illustrates an exemplary consumer alkaline battery with an installed printed circuit board to transmit battery status information, in accordance with one aspect of the present disclosure.

FIG. 1 illustrates an exemplary apparatus 100 including a consumer alkaline battery 110, and an installed printed circuit board 120 that includes a variety of interconnected components that transmit a status of a battery. The printed circuit board 120 may be electrically connected to the cathode of the battery 130, and the anode of the battery 140, for example by making a low-impedance connection through wires, clips, or otherwise. Consumer alkaline batteries 110, in particular, may benefit from the installed printed circuit board 120 because alkaline batteries often require replacement in consumer electronic devices and trips to a retailer to purchase new batteries, and as such battery status information is particularly relevant.

The active material of the anode may comprise zinc. The active material of the cathode may comprise a composition comprising manganese oxide and/or manganese dioxide. Manganese dioxide may comprise gamma manganese dioxide, lambda manganese dioxide, or combinations thereof. Manganese dioxide may be prepared electrolytically as electrolytic manganese dioxide (EMD) or chemically as chemical manganese dioxide (CMD). Manganese dioxide is also available as natural manganese dioxide (NMD), however, NMD typically is not employed in alkaline batteries. Mixtures of more than one of EMD, CMD, and NMD may be used. Accordingly, as used herein, manganese dioxide refers to EMD, CMD, NMD and combinations thereof.

Active material compositions for cathodes comprising manganese dioxide may contain at least about 91 percent by weight (e.g., impurities such as sulfate salts, various metals and the like are present in an amount no greater than 9% by weight). Commercially available EMD is provided as a composition comprising a high purity, high density, gamma manganese dioxide, and is desirable as a cathode active material for alkaline cells. CMD has also been used as electrochemically active cathode material in electrochemical cells including alkaline cells and heavy-duty cells; however, commercial chemical processes yield high purity $MnO_2$ but do not yield densities of $MnO_2$ comparable to that of EMD. As a result EMD has become the most widely used form of battery grade $MnO_2$, particularly for alkaline and lithium cells, since in such application it has become most desirable to employ high density $MnO_2$ to increase the capacity of these cells.

EMD is typically manufactured from direct electrolysis of a bath of manganese sulfate and sulfuric acid. Battery grade CMD may be produced via the "Sedema process," by employing the reaction mixture of $MnSO_4$ and an alkali metal chlorate, preferably $NaClO_3$, as disclosed by U.S. Pat. No. 2,956,860 (Welsh). Distributors of manganese dioxides include Tronox, Erachem, Tosoh, Delta Manganese, and Xiangtan.

Conventional battery grade manganese dioxide-containing compositions do not have a true stoichiometric formula $MnO_2$, but are better represented by the formula $MnO_x$, wherein x is typically between about 1.92 to 1.96, corresponding to a manganese valence of between about 3.84 and 3.92. Conventional EMD may typically have a value for x of about 1.95 or 1.96, corresponding to a manganese valence of 3.90 and 3.92, respectively. Conventional EMD also has a real density of between about 4.4 and 4.6 g/cm3.

In other embodiments of the present disclosure, the printed circuit board 120 installed on other primary batteries or secondary batteries, for example, a primary lithium-ion battery, or a secondary battery such as a nickel metal hydride (NiMH) battery, a nickel cadmium (NiCad) battery, a silver/zinc battery, a nickel/zinc battery, or a lithium solid state rechargeable battery. For rechargeable chemistries, the terminals of the battery switch during charging or discharging. Regardless, in a secondary rechargeable battery, the electrically conductive external surface of the battery comprises the positive terminal while discharging and being used to power a device.

Figure 2:
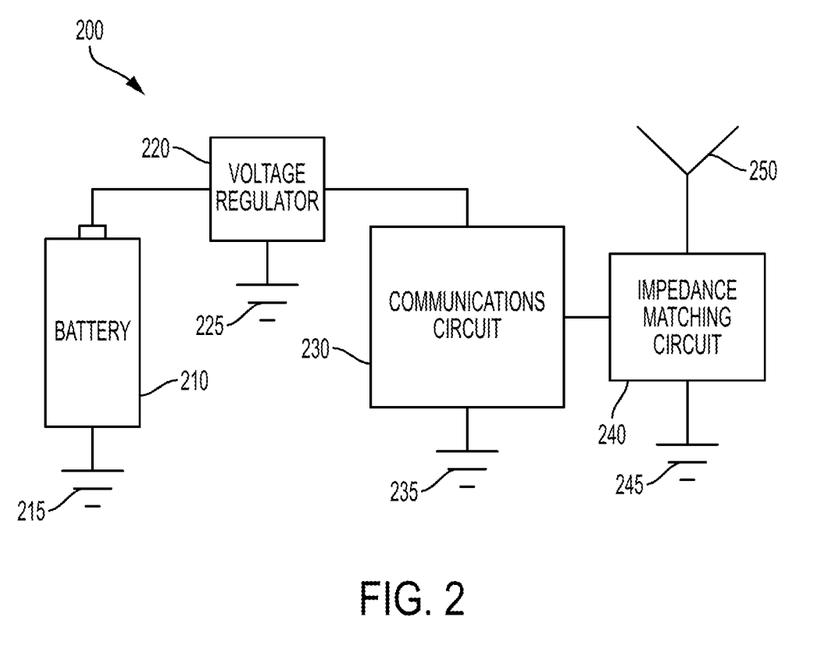
FIG. 2 illustrates an exemplary block diagram of an apparatus to detect a voltage of a battery, and communicate battery status information over an antenna, in which an anode is used as a ground plane.

FIG. 2 illustrates a block diagram of an exemplary apparatus 200 to detect and transmit battery status information. The apparatus 200 includes a battery 210, with an anode of the battery electrically connected to a ground 215, and a cathode of the battery electrically connected to an input of a voltage regulator 220. In some embodiments, the voltage regulator 220 may step-up a single alkaline cell voltage to a suitable voltage to power a communications circuit 230, for example to 2.4 volts or 3 volts. The voltage regulator 220 may be electrically connected to a ground 225 with a low impedance electrical path to the ground 215 and the anode of the battery 210. In some embodiments, the voltage of the battery cell may be offset at the input of an analog to digital converter (ADC) to effectively improve the resolution of the ADC.

In some embodiments, the communications circuit 230 may include a ground plane with a low impedance path to a ground 235. The ground 235 may share a low impedance path with voltage regulator ground 225, and the anode of the battery ground 215 to provide an appropriate electrical reference for proper functioning of the ADC disposed within the communications circuit 230. In some embodiments, a ground plane of the digital circuitry of the communications circuit 230 may be electrically isolated with a relatively high impedance from a ground plane of the radio frequency transmission circuitry.

A transmitter disposed within the communications circuit 230 may include a balanced connection to an impedance matching circuit 240. In other embodiments, the connection between the communications circuit 230 and the impedance matching circuit 240 may include an unbalanced connection, with an impedance of 50 ohms, or otherwise as a characteristic input impedance to the impedance matching circuit 240.

The impedance matching circuit 240 is configured to convert an input impedance encountered by the communications circuit 230 to an output impedance for a particular frequency, using a variety of passive and active electrical components. The output impedance of the impedance matching circuit 240 may approximate the characteristic input impedance of an antenna 250 and any associated wiring or electrical connections. In other embodiments, the impedance matching circuit may be configured to minimize a reflected power from the antenna 250 as a result of a signal transmitted at a particular frequency, or set of frequencies, from the communications circuit.

Embodiments of the impedance matching circuit 240 may include one or a plurality of connections to a ground 245. The ground 245 may include a low impedance path to the grounds 235, 225, and 215 of the remainder of the apparatus 200. In some embodiments, the ground 245 of the impedance matching circuit 240 may include a ground plane of the antenna 250. In other embodiments the ground plane of the antenna 250 may include the anode of the battery 210 and an electrical length of the anode of the battery 210 may be significantly less than 0.25 the wavelength of a signal transmitted by the communications circuit 230 into the impedance matching circuit 240.

In another embodiment, the transmitter installed on the battery may include a Bluetooth® Low Energy wireless sensor, for example based on the Texas Instruments CC2540 integrated circuit. In other embodiments, the transmitter may include a UHF transceiver for exchanging data over short distances. The transmitter may include a voltage booster, or voltage regulator to increase the voltage of the single alkaline cell. Such an embodiment may include a printed circuit board installed in proximity to the battery 210, due to space constraints in the battery cavity of most devices. Attachment springs may provide battery an electrical connection to allow an electrical potential for measurement and also power supply to the communications circuit 230.

Proximity of metal to the antenna 250 may detune the antenna 250 away from a frequency range of interest and negatively affect signal transmission and reception. As the distance between the sensor and the battery 210 is reduced, due to space constraints, the detuning effect becomes more pronounced. When an optimum tuned transmitter functions near a metal object, for example near the battery 210, the RF transceiver may be grounded to the positive power supply rail, or the cathode of the battery 210, to make use of the relatively larger cathode terminal, or battery case, as a more effective ground plane. In this case other metal objects, such as additional battery cells and metal parts of the device near the monitored battery, may not interfere substantially with the tuned system of antenna and battery.

Positive Terminal of a Battery as Ground Plane

One exemplary embodiment of the present disclosure includes a universal reusable battery remote indication system that includes one or more silicon integrated circuits that contain an analog to digital converter (ADC) and a communications circuit such as Bluetooth® Low Energy transceiver, Ultra High Frequency (UHF) passive or active Radio Frequency Identification (RFID), WiFi, Zigbee or other means of RF communications, an antenna and resistors and/or capacitors and other components that may be needed for the operation of the system.

Snap-on attachment of the indication system to the battery causes an electrical connection to the battery terminals, or flexible connections can also be used. Options may include double-sided flexible Printed Circuit Boards (PCBs) inserted between the battery and the device battery contact and electrically connected between the two sides, or flexible wires with conductive magnets to attach to the device battery terminals.

A battery indicator may connect to and communicate with a reader or receiver, to include a smart phone or other BLE, RFID, UHF, WiFi or similar enabled communication device. A software application executing on the reader may display the battery status, for example voltage, impedance, load, distance, temperature, time or other parameters. The software application may interpret these parameters to provide a user of the application an indication of battery status and/or a recommendation of when to replace or recharge the battery.

One embodiment of the present disclosure includes a single-cell BLE Monitor (Bluetooth® Low-Energy also known as Bluetooth® 4.xx or "Smart") wherein the electronics are integrated in an ASIC (Application Specific Integrated Circuit) with common ground (DC/DC, ADC and RF) connected to the positive power supply rail or cathode of the battery. The antenna may be placed on the outer side of the sensor PCB (printed or integrated) and may be tuned to a fixed position versus the battery cell, which may be at a distance one PCB thickness plus the battery label thickness. An incorporated voltage boost converter may enable operation down to 0.8V-0.9V. The board may include two snap-on battery attachments that provide power and voltage measurement connections between battery and sensor. The sensor may attach to a single battery cell and may be placed in a device in non-interfering way between the other battery cells. The assembly may rotate to the most suitable position, depending on the battery compartment specifics. The battery attachment may, in some embodiments, be customized to a specific battery type.

The BLE battery monitor may be read wirelessly, using a BLE enabled smart phone with an integrated reader software application. The reader software application may display distance to the devices, assisting the user to locate the devices by moving and watching the RF signal strength increasing (indicating closer) or decreasing (indicating further).

The functionality of the Reusable Wireless Battery Monitor may not be limited to indication of battery state of charge and distance to the device. The BLE module may include a built-in MCU that can be programmed to a variety of additional functions, such as battery impedance or internal resistance measurement (state of health), temperature, pressure, leakage, safety and low-battery alerts, charge control, power management functions, or other battery related characteristics.

Figure 3:
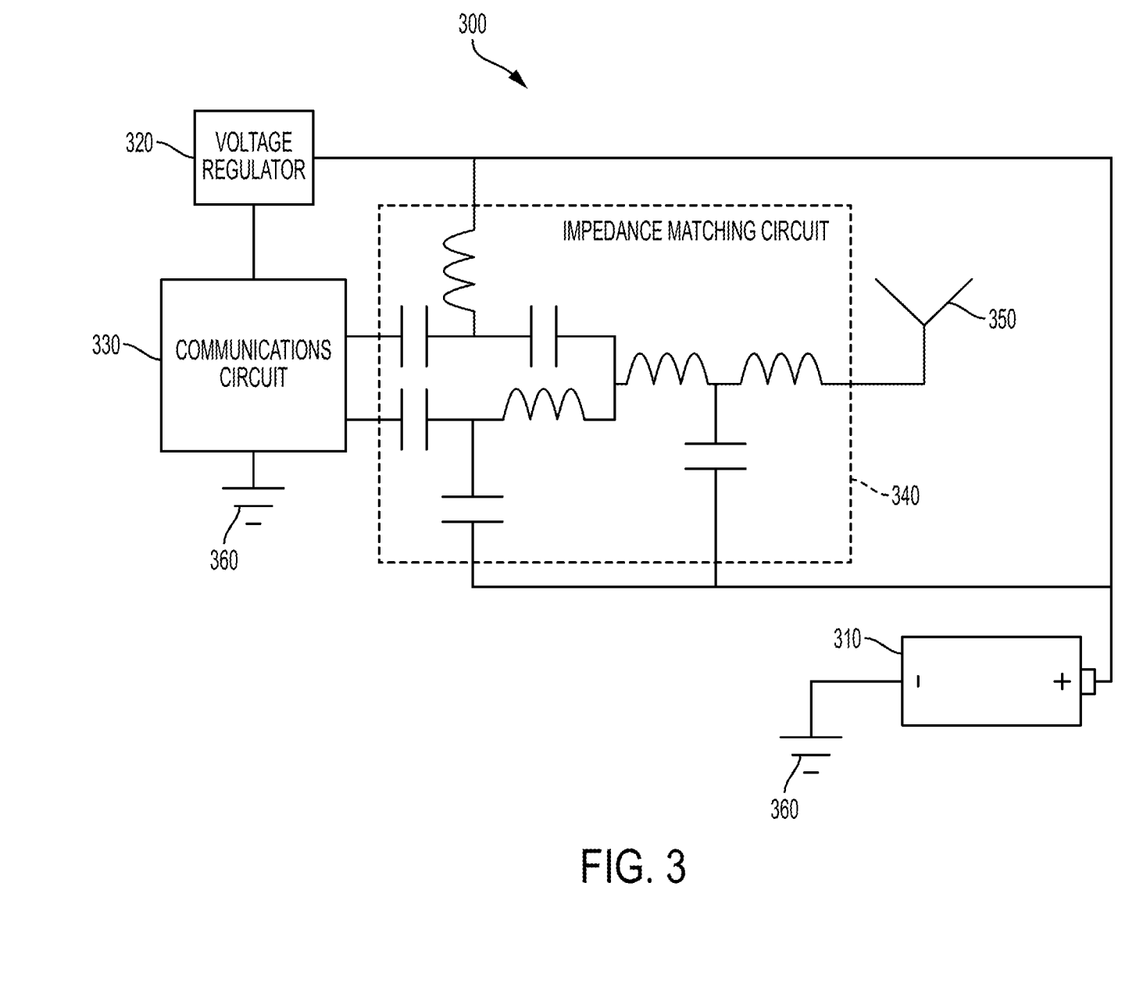
FIG. 3 illustrates an exemplary block diagram of an apparatus to use a cathode of an alkaline battery as a ground plane for an antenna, including a capacitor/inductor based impedance matching circuit, in accordance with one aspect of the present disclosure.

FIG. 3 illustrates one exemplary embodiment of the present disclosure that includes a block diagram of an apparatus 300. The apparatus 300 includes a battery 310 with a negative terminal of the battery electrically connected with a low impedance to a ground 360. A positive terminal of the battery 310 may be electrically connected with a low impedance to a voltage regulator 320 and one or more ground connections of an impedance matching circuit 340.

The impedance matching circuit 340, as illustrated may include a variety of passive electrical components, such as capacitors, resistors, and inductors, that together are configured to convert an input impedance of the impedance matching circuit 340 to an output impedance of the impedance matching circuit 340. In some embodiments, such as illustrated in FIG. 3, the input to the impedance matching circuit 340 may include a balanced differential pair of conductors, and the output includes an unbalanced output and variety of a ground connections. However, other alternative embodiments may include unbalanced inputs, balanced outputs, or other combinations therein.

The communications circuit 330 may include one or more analog to digital converters (ADCs) to receive an electrical potential from the battery 310 and convert the analog potential to a digital signal for transmission. In other embodiments, the communications circuit may convert the analog potential from the battery 310 to directly modulate an RF signal without an ADC to modulate an RF signal solely with the electric potential, or current provided by the cell of the battery 310. In some embodiments, the communications circuit 330 may share a low impedance ground connection 360 with the anode of the battery 310.

The impedance matching circuit 340 may electrically connect to an antenna 350, as illustrated with an unbalanced connection, for example with a 50 ohm impedance. Such embodiments may include antennas 350 that require an effective ground plane to radiate RF energy in a relatively omnidirectional pattern and prevent reflected power back into the communications circuit 330 or impedance matching circuit 340. As illustrated in FIG. 3, by connecting the ground connections of the impedance matching circuit 340 to the cathode of the battery 310, the cathode of the battery 310 may act as a ground plane of the antenna 350. In the embodiment wherein the battery 310 is a consumer alkaline battery, the cathode of the battery 310 may comprise a majority of the external surface area of the battery and provide an electrical length greater than 0.25 of the wavelength of transmitted signal from the communications circuit 330 into the impedance matching circuit 340.

One implementation of the embodiment illustrated in FIG. 3 may include the apparatus 300 integrated into a flexible assembly in a manner that it does not interfere with an available battery cavity. Such an embodiment may be applied to, for example, a AA, AAA, C, or D battery types without further modifications. In order to effectively utilize the alkaline battery case or positive terminal as a ground plane, a BLE Transceiver antenna impedance matching circuit may be grounded to the positive power supply rail, or the grounded ends of inductors and capacitors within the impedance matching circuit. To effectively function otherwise, the remainder of the apparatus may be grounded to the negative power supply rail, or anode of the battery. In such an embodiment, the detuning caused by proximity to the battery's metal case is eliminated.

Figure 4:
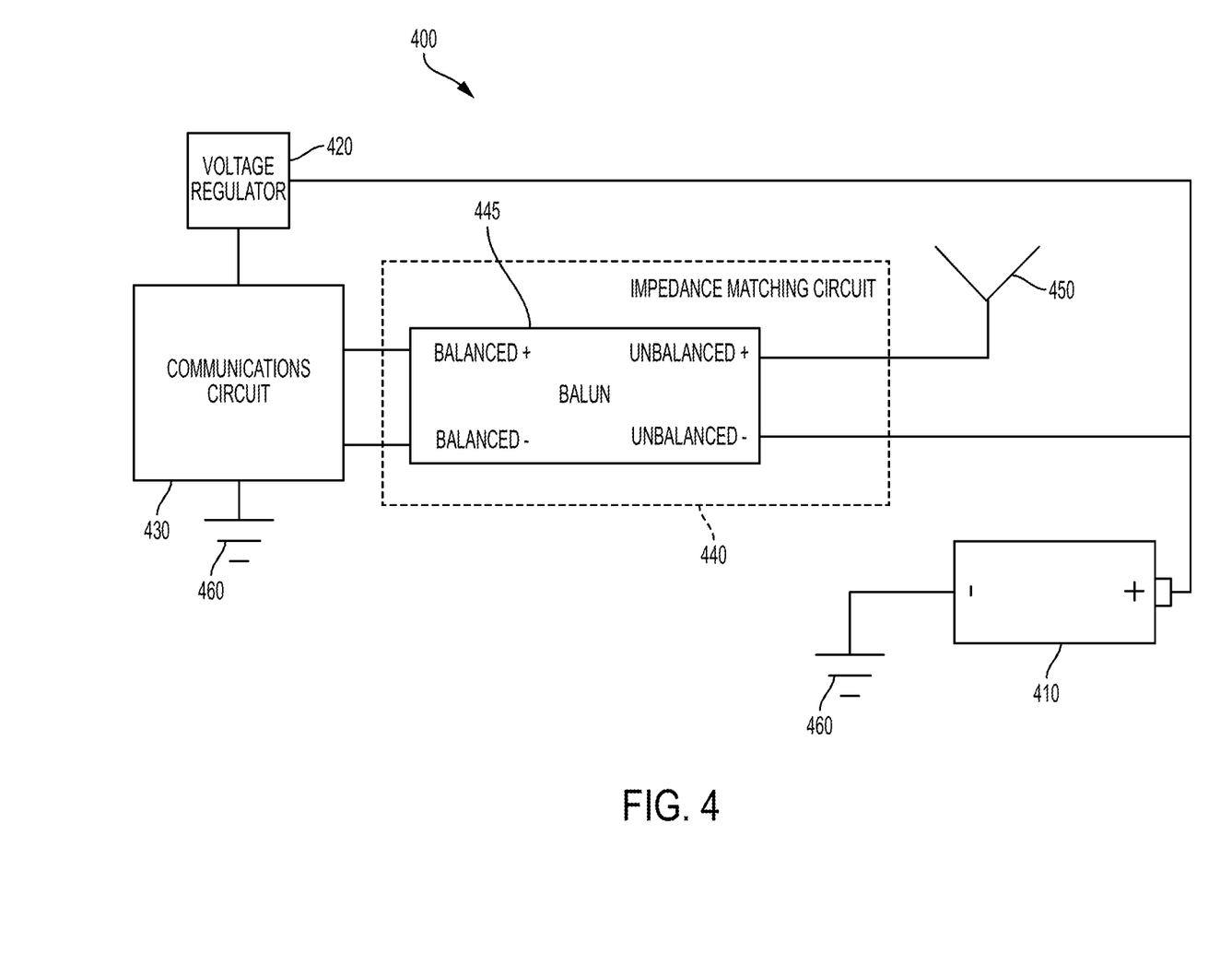
FIG. 4 illustrates an exemplary block diagram of an apparatus to use a cathode of an alkaline battery as a ground plane for an antenna, including a balun based impedance matching circuit, in accordance with one aspect of the present disclosure.

Alternatively, as illustrated in the exemplary embodiment of FIG. 4, an output impedance matching balun, which may also be a DC blocking component, can be grounded to the positive battery can. FIG. 4 illustrates a block diagram of an apparatus 400 that includes a battery 410, likewise with the cathode of the battery 410 electrically connected to a voltage regulator 420 and the anode of the battery 410 electrically connected to a ground 460. The voltage regulator functions in a similar way as the embodiment of FIG. 3, together with the communications circuit 430 to communicate a status of the battery 410. Likewise, the communications circuit 430 may share a ground connection 460 with the anode of the battery to function effectively.

However, the embodiment illustrated in FIG. 4 includes an impedance matching circuit 440 that includes a balun 445 that converts a balanced signal from the communications circuit 430 to an unbalanced signal for an antenna 450. The negative end of the unbalanced end of the balun 445 may be electrically connected to the cathode of the battery to effectively use the cathode of the battery as a ground plane for the antenna 450.

In one particular embodiment, the balun 445 may include a balanced and unbalanced windings around a magnetic ferrite, configured as necessary to convert a balanced input impedance to an unbalanced output impedance. As illustrated in FIG. 4, both ends of the balanced connection may be electrically connected to the communications circuit 430, one end of the unbalanced winding electrically connected to the antenna 450, and one end of the unbalanced winding electrically connected to the cathode of the battery.

By using the battery connections as illustrated in FIG. 4, the sensor module and hence the antenna, which are, for example, printed on an outer side of the PCB or surface-mounted chip antenna, may remain at a fixed small distance from the metal battery can or cathode of the battery 410 and the balun 445 may be tuned specifically for that distance. In one specific embodiment, the battery length (e.g., 50 mm for AA and 45 mm for AAA sizes respectively) may approximate a half wavelength (e.g., 61.2 mm) of a center 2.45 GHz carrier frequency and may form an effective ground plane for the antenna 450.

Signal Reception Improvements with Positive Terminal Antenna Ground Plane

Figure 5:
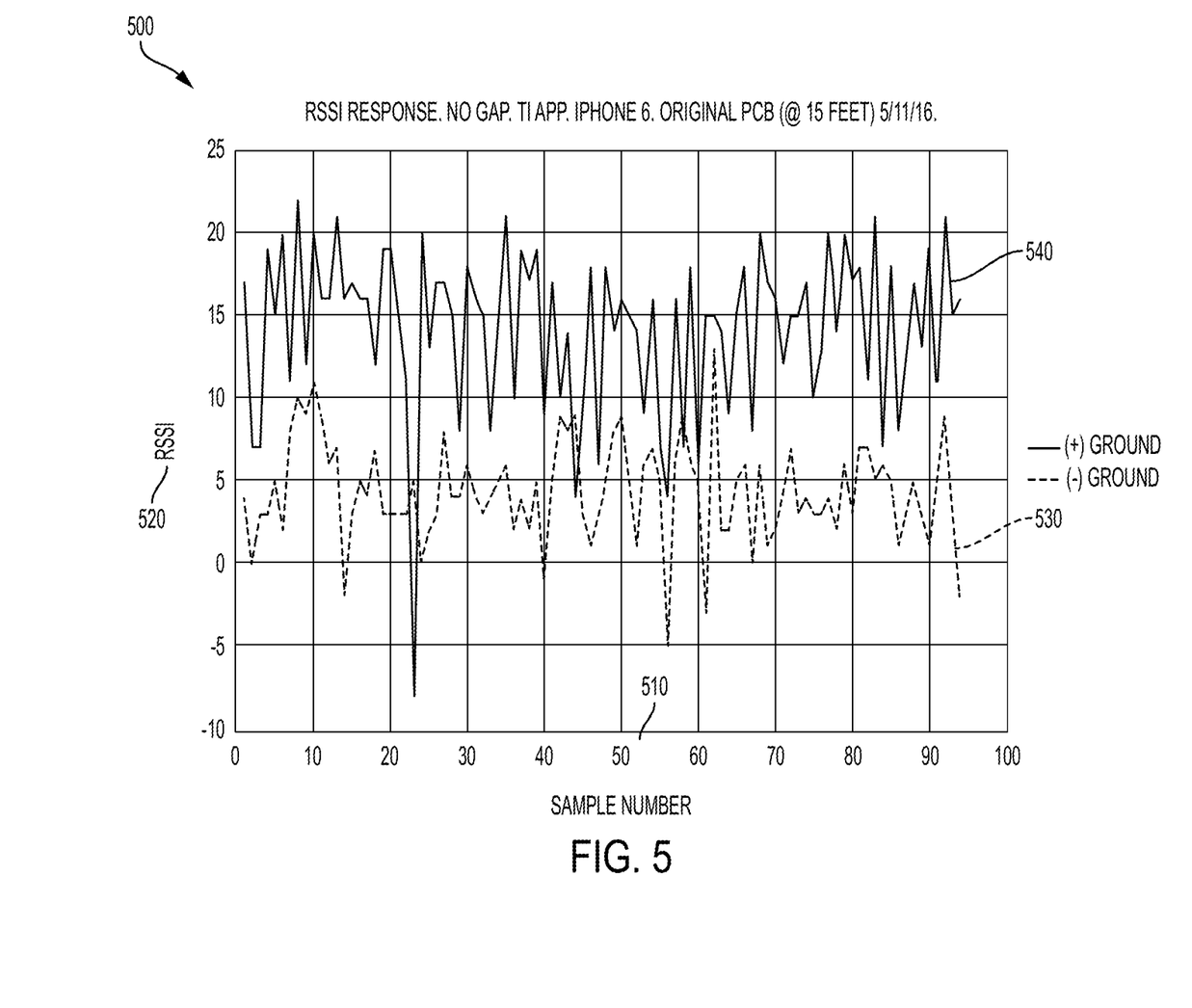
FIG. 5 illustrates an exemplary received signal strength indication (RSSI) plot over a variety of samples including an anode ground plane and a cathode ground plane, in accordance with one aspect of the present disclosure.

FIG. 5 illustrates a received signal strength indication (RSSI) graph 500 that represents the received signal strength 520 from a Bluetooth Low-Energy sensor mounted on a Duracell alkaline AA battery, measured with an iPhone 6 at 20 feet away using a Texas Instruments "Sensor Tag" app for a variety of samples 510 plotted using the negative terminal as a ground plane 530, as compared with the positive terminal as the ground plane 540.

In one embodiment, the received RF power, using the cathode as the ground plane approximates at −85 decibels over one milliwatt (dBm), compared to −95 dBm when using the anode of the battery as a ground plane. The received signal strength may determine if communications will be established and if data packets are successfully exchanged between the sensor and the reader, for example between the battery and the smart phone. Stronger signals result in a better range, or maximum distance, between the sensor and the reader, or alternatively lower power consumption of the sensor for the same distance. For example, the average current drain of the sensor may be limited to about 10 microamps, if several years of service life are desired without significant reduction of battery life. The difference illustrated in FIG. 5 of approximately 10 dBm shown may result in approximately 10 times lower RF power for the sensor with cathode ground plane for the antenna. Active RF transmission and/or reception may represents the heaviest load on the battery and may factor in battery life calculations. As such, corrections for such load during transmission and/or reception may be accounted for during calculation of remaining battery capacity.

Directionality of Signal Reception with Positive Terminal Antenna Ground Plane

Figure 6:
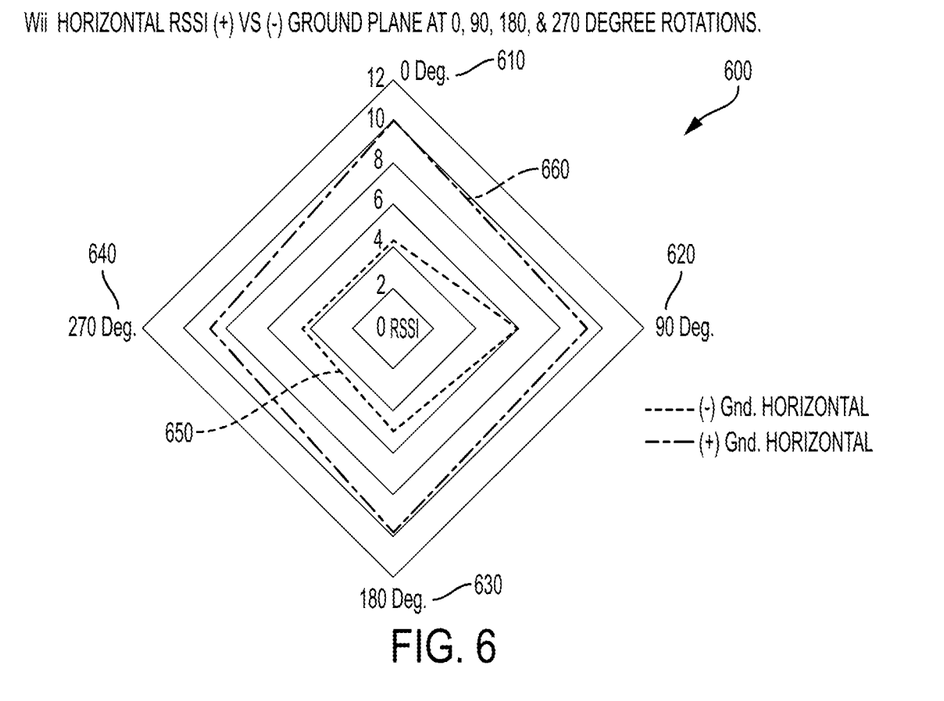
FIG. 6 illustrates an exemplary RSSI polar plot for a horizontal orientation of a receiver relative to an anode ground plane and a cathode ground plane, in accordance with one aspect of the present disclosure.
Figure 7:
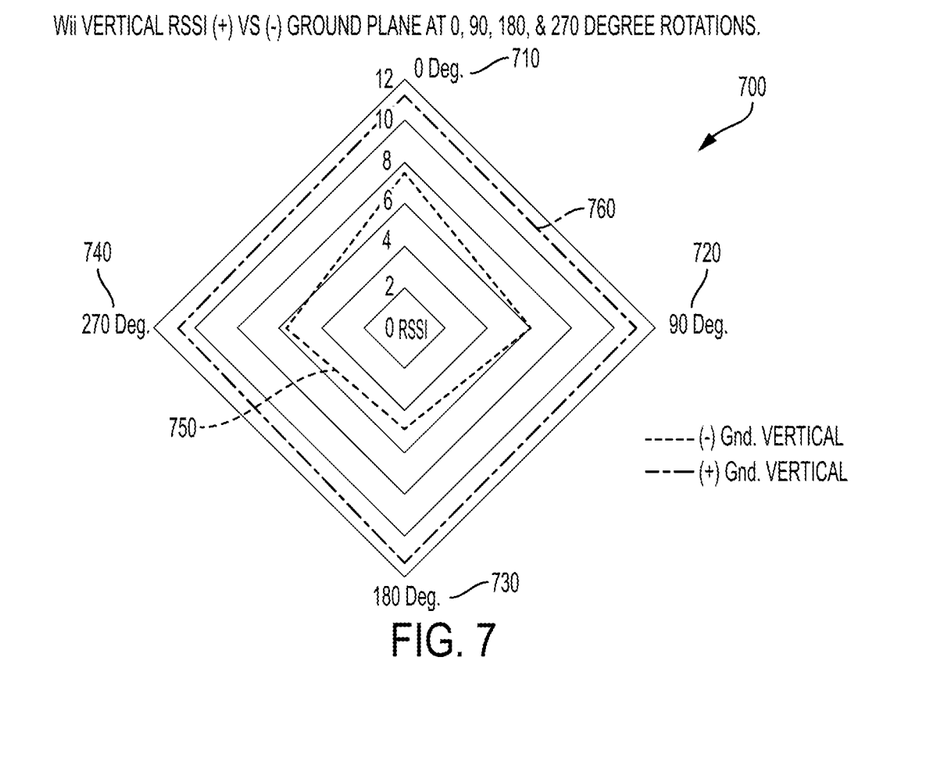
FIG. 7 illustrates an exemplary RSSI polar plot for a vertical orientation of a receiver relative to an anode ground plane and a cathode ground plane, in accordance with one aspect of the present disclosure.

FIGS. 6 and 7 illustrate polar RSSI plots for a horizontal orientation 600 and vertical orientation 700 with the results of further testing performed with two AA alkaline cells side by side and the voltage sensor board mounted on one of them. The device was rotated for each of the horizontal and vertical orientation in four relative directions, 0 degrees for axis 610 and 710, 90 degrees for axes 620 and 720, 180 degrees for axes 630 and 730, and 270 degrees for axes 640 and 740. The averages of the RSSI were taken from 60 points for each direction over 1 minute period (one sample per second).

As illustrated in FIGS. 6 and 7, the test results show consistent significant advantage of the cathode, or positive terminal ground plane, as indicated by plot 660 and 760, versus the anode, or negative terminal ground plane, as indicated by plot 650 and 750. The advantage of positive terminal grounding was further confirmed with other devices and metal objects in proximity to the sensor.

Fabrication and Use of Positive Terminal Antenna Ground Plane

Figure 8:
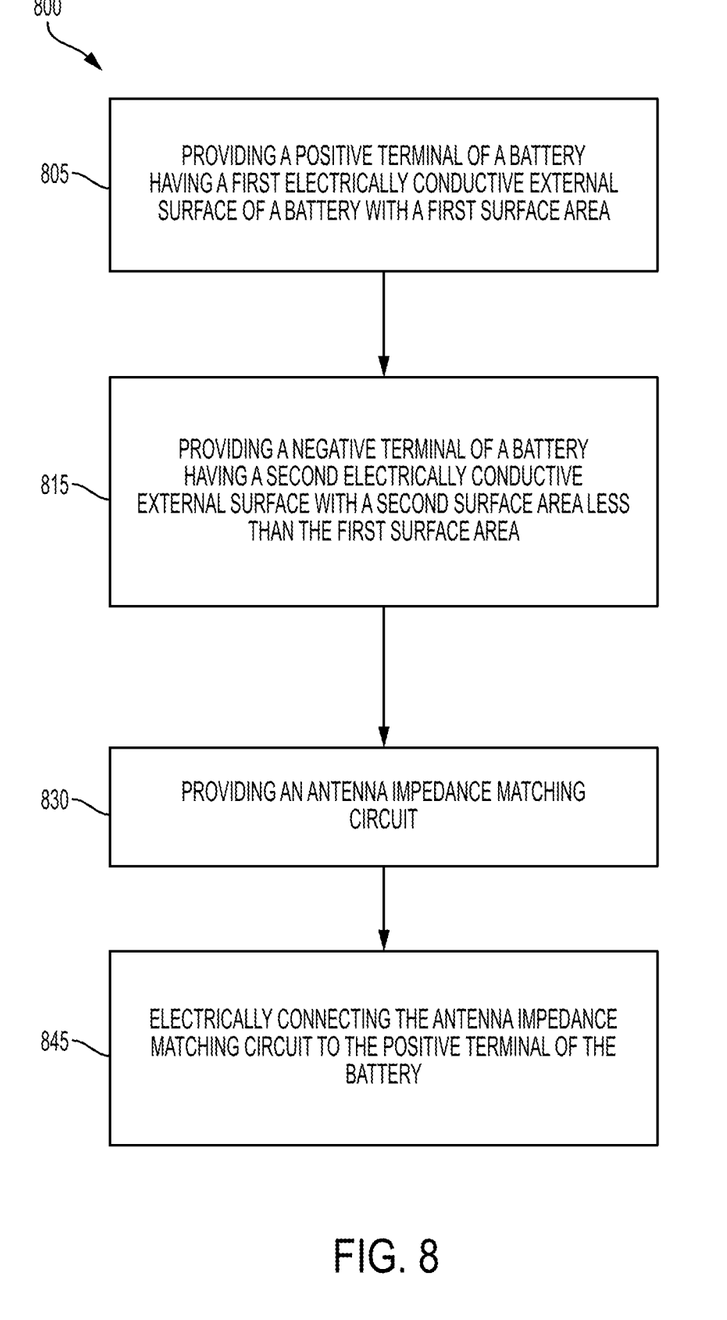
FIG. 8 illustrates an exemplary block diagram of a method to electrically connect an antenna impedance matching circuit to an external surface of a battery.

FIG. 8 illustrates a block diagram 800 that represents one embodiment of a method to fabricate and/or use the positive terminal of a battery as an antenna ground plane. For example, the block diagram 800 includes providing a positive terminal of a battery having a first electrically conductive external surface with a first surface area (block 805). Furthermore, the block diagram 800 includes providing a negative terminal of a battery having a second electrically conductive external surface with a second surface area less than the first surface area (block 815). By providing an antenna impedance matching circuit (block 830) the antenna impedance matching circuit may be electrically connected to the positive terminal of the battery (block 845).

Other embodiments include electrically connecting the antenna impedance matching circuit to a communication circuit and an antenna. Furthermore, alternative embodiments include electrically connecting a ground plane of the communication circuit to the negative terminal of the battery. Still further, alternative embodiments include providing a balun configured to convert an input impedance encountered by a signal transmitted by the communication circuit into the impedance matching circuit to an output impedance. Other embodiments include providing the first electrically conductive external surface of the battery with an electrical length greater than 0.25 of a wavelength of a signal transmitted by the communication circuit into the antenna impedance matching circuit.

Alternative embodiments include providing the first electrically conductive external surface of the battery with an electrical length that minimizes a reflected power from the antenna back into the antenna impedance matching circuit as a result of the communication circuit transmitting the signal. Still further, embodiments include providing the antenna impedance matching circuit with at least one of (i) a capacitor and (ii) an inductor, and electrically connecting at least one of (i) the capacitor and (ii) the inductor between a communication circuit and the positive terminal of the battery.

Other alternative embodiments include providing an alkaline primary battery comprising an anode, a cathode, and an alkaline electrolyte; electrically connecting the cathode of the battery to the first electrically conductive external surface of a battery; and electrically connecting the anode of the battery to the second electrically conductive external surface of a battery. Still further, embodiments include providing a balun comprising a first winding and a second winding around a magnetic ferrite such that an output impedance of the balun approximates an input impedance of the antenna; electrically connecting a first end of the first winding to the antenna; and electrically connecting a second end of the first winding to the first electrically conductive external surface of the battery.

Yet another embodiment includes electrically connecting a first end of the second winding to the communication circuit; and electrically connecting a second end of the second winding to the antenna.

Alternative Embodiments

In one embodiment the RF antenna may be kept at a fixed distance from the battery case to form a tuned radiator with the battery can as a ground plane. The circuit board may be protected by an enclosure in the form of a triangular or trapezoid prism or other shape for a better fit between two of the round cylindrical battery cells, and to assure consistent antenna location.

In other embodiments the antenna impedance matching components may be switched from negative to positive ground to effectively turn the battery can into a ground plane.

In still other alternative embodiments, a 2.45 GHz Impedance Matched Balun, such as the BPF P/N2450BM15A0002 from High Frequency RF Solutions, may be grounded to the battery case (the positive power supply rail) instead of the common negative ground. As a DC block may not be required for the balun grounding, its function may not be affected by the change in balun grounding. The antenna and the alkaline battery case as a ground plane in such an embodiment may form an optimum RF radiator. The sensor module may in some embodiments be permanently attached internally in the battery-powered device.

ADDITIONAL CONSIDERATIONS

All of the foregoing computer systems may include additional, less, or alternate functionality, including that discussed herein. All of the computer-implemented methods may include additional, less, or alternate actions, including those discussed herein, and may be implemented via one or more local or remote processors and/or transceivers, and/or via computer-executable instructions stored on computer-readable media or medium.

The processors, transceivers, mobile devices, service terminals, servers, remote servers, database servers, heuristic servers, transaction servers, and/or other computing devices discussed herein may communicate with each via wireless communication networks or electronic communication networks. For instance, the communication between computing devices may be wireless communication or data transmission over one or more radio links, or wireless or digital communication channels.

Customers may opt into a program that allows them share mobile device and/or customer, with their permission or affirmative consent, with a service provider remote server. In return, the service provider remote server may provide the functionality discussed herein, including security, fraud, or other monitoring, and generate recommendations to the customer and/or generate alerts for the customers in response to abnormal activity being detected.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to improvements to computer functionality, and improve the functioning of conventional computers.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. An apparatus, comprising:
   a positive terminal of a battery as a ground plane of an antenna, comprising a first electrically conductive external surface with a first surface area;
   a negative terminal of the battery, comprising a second electrically conductive external surface with a second surface area;
   an antenna impedance matching circuit, electrically connected between a communication circuit, an antenna, and the first electrically conductive external surface of the battery;
   wherein the first surface area is greater than the second surface area.

2. The apparatus of claim 1, wherein the first electrically conductive external surface electrically connects to a cathode of the battery, and the second electrically conductive external surface electrically connects to an anode of the battery.

3. The apparatus of claim 1, wherein a ground plane of the communication circuit electrically connects to the negative terminal of the battery.

4. The apparatus of claim 1, wherein the antenna impedance matching circuit comprises a balun configured to convert, for a first communication frequency, an input impedance of the impedance matching circuit to an output impedance of the impedance matching circuit.

5. The apparatus of claim 1, wherein an electrical length of the first electrically conductive external surface is greater than 0.25 of a wavelength of a signal transmitted by the communication circuit into the antenna impedance matching circuit, and
   wherein the electrical length of the first electrically conductive external surface is a physical length of the first electrically conductive external surface multiplied by the ratio of (i) the propagation time of the signal through the first electrically conductive external surface to (ii) the propagation time of the signal in free space over a distance equal to the physical length of the first electrically conductive external surface.

6. The apparatus of claim 5, wherein the electrical length of the first electrically conductive external surface is configured to minimize a reflected power from the antenna back into the antenna impedance matching circuit as a result of the communication circuit transmitting the signal.

7. The apparatus of claim 4, wherein the balun comprises a first winding and a second winding around a magnetic ferrite, wherein a first end of the first winding is electrically connected to the antenna, and a second end of the first winding is electrically connected to the positive terminal of the battery.

8. The apparatus of claim 7, wherein a first end of the second winding is electrically connected to the communication circuit, and wherein a second end of the second winding is electrically connected to the antenna.

9. The apparatus of claim 1, wherein the antenna impedance matching circuit comprises at least one of (i) a capacitor and (ii) an inductor, and wherein at least one of (i) the capacitor and (ii) the inductor are electrically connected between the communication circuit and the positive terminal of the battery.

10. The apparatus of claim 1, wherein the battery is a primary alkaline battery.

11. A method, comprising:
    providing a positive terminal of a battery as a ground plane of an antenna, comprising a first electrically conductive external surface with a first surface area;
    providing a negative terminal of the battery, comprising a second electrically conductive external surface with a second surface area less than the first surface area;
    providing an antenna impedance matching circuit; and electrically connecting the antenna impedance matching circuit between the positive terminal of the battery, a communication circuit, and the antenna.

12. The method of claim 11, comprising electrically connecting a ground plane of the communication circuit to the negative terminal of the battery.

13. The method of claim 11, comprising providing a balun configured to convert an input impedance encountered by a signal transmitted by the communication circuit into the impedance matching circuit to an output impedance.

14. The method of claim 11, comprising providing the first electrically conductive external surface with an electrical length greater than 0.25 of a wavelength of a signal transmitted by the communication circuit into the antenna impedance matching circuit.

15. The method of claim 14, comprising providing the first electrically conductive external surface with an electrical length that minimizes a reflected power from the antenna back into the antenna impedance matching circuit as a result of the communication circuit transmitting the signal.

16. The method of claim 11, wherein providing the antenna impedance matching circuit comprises providing at least one of (i) a capacitor and (ii) an inductor, and electrically connecting at least one of (i) the capacitor and (ii) the inductor between a communication circuit and the positive terminal of the battery.

17. The method of claim 11, wherein:
the battery is a primary alkaline battery comprising a cathode connected to a metal battery can; and
electrically connecting the antenna impedance matching circuit between the positive terminal of the battery, the communication circuit, and the antenna comprises:
electrically connecting the antenna impedance matching circuit between the cathode of the primary alkaline battery, the communication circuit, and the antenna.

18. The method of claim 11, wherein providing the antenna impedance matching circuit comprises:
providing a balun comprising a first winding and a second winding around a magnetic ferrite such that an output impedance of the balun approximates an input impedance of the antenna;
electrically connecting a first end of the first winding to the antenna; and
electrically connecting a second end of the first winding to the positive terminal of the battery.

19. The method of claim 18, further comprising:
electrically connecting a first end of the second winding to the communication circuit; and
electrically connecting a second end of the second winding to the antenna.

* * * * *